US012548523B2

(12) United States Patent
Keum et al.

(10) Patent No.: US 12,548,523 B2
(45) Date of Patent: Feb. 10, 2026

(54) DRIVING CIRCUIT

(71) Applicant: Samsung Display Co., Ltd., Yongin-Si (KR)

(72) Inventors: Nackhyeon Keum, Yongin-si (KR); Kyunghoon Kim, Yongin-si (KR); Jeonghun Bang, Yongin-si (KR); Hyungjin Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/986,706

(22) Filed: Dec. 19, 2024

(65) Prior Publication Data

US 2025/0266003 A1 Aug. 21, 2025

(30) Foreign Application Priority Data

Feb. 19, 2024 (KR) ........................ 10-2024-0023663

(51) Int. Cl.
*G09G 3/3266* (2016.01)
*G09G 3/36* (2006.01)

(52) U.S. Cl.
CPC ... *G09G 3/3266* (2013.01); *G09G 2310/0286* (2013.01); *G09G 2310/08* (2013.01)

(58) Field of Classification Search
CPC ........................... G09G 3/3677; G09G 3/3266
See application file for complete search history.

(56) References Cited

U.S. PATENT DOCUMENTS

| | | | | |
|---|---|---|---|---|
| 2017/0278450 | A1* | 9/2017 | Ma | G09G 3/3677 |
| 2017/0287413 | A1* | 10/2017 | Li | G09G 3/20 |
| 2020/0168160 | A1* | 5/2020 | Oh | G06F 1/08 |
| 2021/0074215 | A1* | 3/2021 | Park | G09G 3/3266 |
| 2021/0193007 | A1* | 6/2021 | Cheng | G09G 3/3266 |
| 2022/0208075 | A1 | 6/2022 | Kim et al. | |
| 2023/0071031 | A1* | 3/2023 | Qing | G11C 19/28 |
| 2023/0206853 | A1* | 6/2023 | Kim | G09G 3/3266 345/204 |
| 2023/0215381 | A1* | 7/2023 | Ahn | G11C 19/28 345/204 |
| 2024/0071314 | A1 | 2/2024 | Keum et al. | |
| 2024/0224719 | A1* | 7/2024 | Bai | G09G 3/3233 |
| 2024/0242677 | A1* | 7/2024 | Han | G09G 3/3677 |

FOREIGN PATENT DOCUMENTS

| | | | |
|---|---|---|---|
| KR | 10-2022-0074700 | A | 6/2022 |
| KR | 10-2022-0093764 | A | 7/2022 |
| KR | 10-2022-0094916 | A | 7/2022 |
| KR | 10-2023-0101507 | A | 7/2023 |
| KR | 10-2023-0103629 | A | 7/2023 |

* cited by examiner

*Primary Examiner* — Sepehr Azari
(74) *Attorney, Agent, or Firm* — Innovation Counsel LLP

(57) ABSTRACT

A driving circuit which provides stable signals during low-frequency driving includes a plurality of stages, wherein each of the plurality of stages comprises a stabilization circuit maintaining a voltage level of a node to which a gate of a pull-down transistor is connected at a turn-on voltage level of the pull-down transistor.

22 Claims, 17 Drawing Sheets

DRIVING CIRCUIT

CROSS-REFERENCE TO RELATED APPLICATION

This application is based on and claims priority under 35 U.S.C. § 119 to Korean Patent Application No. 10-2024-0023663, filed on Feb. 19, 2024, in the Korean Intellectual Property Office, the disclosure of which is incorporated by reference herein in its entirety.

BACKGROUND

1. Field

The present disclosure relates to a driving circuit and a display device including the same.

2. Description of the Related Art

In general, a display device includes a pixel area including a plurality of pixels, a gate driving circuit, a data driving circuit, and a controller. The gate driving circuit includes stages connected to gate lines, and the stages supply gate signals to the gate lines connected thereto, in response to signals from the controller.

SUMMARY

The present disclosure may include a driving circuit from which gate signals may be stably provided and a display device including the driving circuit. The technical problems to be achieved by the present disclosure are not limited to the technical problems described above, and other technical problems not described herein will be clearly understood from the present description by those of ordinary skill in the art.

Additional aspects will be set forth in part in the description which follows and, in part, will be apparent from the description, or may be learned by practice of the presented embodiments of the disclosure.

According to an embodiment, a driving circuit includes a plurality of stages, wherein each of the plurality of stages includes a first transistor connected between a first terminal to which a start signal is input and a first node and including a gate connected to a clock terminal to which a clock signal is input, a second transistor connected between the first node and a second node and including a gate connected to a second terminal to which a first voltage is input, a third transistor connected between a third terminal to which a second voltage higher than the first voltage is input and a third node and including a gate connected to the first node, a fourth transistor connected between the third node and the second terminal and including a gate connected to the second node, a fifth transistor connected between an output terminal and the second terminal and including a gate connected to the second node, a sixth transistor connected between the third terminal and the output terminal and including a gate connected to the third node, a first capacitor connected between the output terminal and the second node, and a second capacitor connected between the output terminal and a fourth node that is between the first transistor and the second transistor.

According to an embodiment, the fourth node may be the first node.

According to an embodiment, the driving circuit may further include a seventh transistor connected between the first node and the second transistor and including a gate connected to the second terminal, wherein the fourth node may be a node between the seventh transistor and the second transistor.

According to an embodiment, the start signal may be an external signal or a gate signal output from a previous stage.

According to an embodiment, a conductive type of the fourth transistor may be opposite to a conductive type of the other transistors.

According to an embodiment, a first clock signal may be input to the clock terminal of each of odd-numbered stages among the plurality of stages, and a second clock signal may be input to the clock terminal of each of even-numbered stages, wherein the second clock signal may be shifted from the first clock signal by a half period.

According to an embodiment, the driving circuit may further include a third capacitor connected between the third terminal and the third node.

According to an embodiment, a driving circuit includes a plurality of stages, wherein each of the plurality of stages includes a first transistor connected between a first terminal to which a start signal is input and a first node and including a gate connected to a clock terminal to which a clock signal is input, a second transistor connected between the first node and a second node and including a gate connected to a second terminal to which a first voltage is input, a third transistor connected between a third terminal to which a second voltage higher than the first voltage is input and a third node and including a gate connected to the first node, a fourth transistor connected between the third node and the second terminal and including a gate connected to the second node, a fifth transistor connected between an output terminal and the second terminal and including a gate connected to the second node, a sixth transistor connected between the third terminal and the output terminal and including a gate connected to the third node, a seventh transistor connected between a fourth node between the first transistor and the second transistor and a fourth terminal to which a third voltage lower than the first voltage is input and including a gate connected to the second node, and a first capacitor connected between the output terminal and the second node.

According to an embodiment, the fourth node may be the first node.

According to an embodiment, the driving circuit may further include an eighth transistor connected between the first node and the second transistor and including a gate connected to the second terminal, wherein the fourth node may be a node between the eighth transistor and the second transistor.

According to an embodiment, the start signal may be an external signal or a gate signal output from a previous stage.

According to an embodiment, a conductive type of the fourth transistor may be opposite to a conductive type of the other transistors.

According to an embodiment, a first clock signal may be input to the clock terminal of each of odd-numbered stages among the plurality of stages, and a second clock signal may be input to the clock terminal of each of even-numbered stages, wherein the second clock signal may be shifted from the first clock signal by a half period.

According to an embodiment, the driving circuit may further include a second capacitor connected between the third terminal and the third node.

According to an embodiment, a driving circuit includes a plurality of stages, wherein each of the plurality of stages includes a first transistor connected between a first terminal to which a start signal is input and a first node and including a gate connected to a clock terminal to which a clock signal is input, a second transistor connected between the first node and a second node and including a gate connected to a second terminal to which a first voltage is input, a third transistor connected between a third terminal to which a second voltage higher than the first voltage is input and a third node and including a gate connected to the first node, a fourth transistor connected between the third node and the second terminal and including a gate connected to the second node, a fifth transistor connected between an output terminal and the second terminal and including a gate connected to the second node, a sixth transistor connected between the third terminal and the output terminal and including a gate connected to the third node, a first capacitor connected between the output terminal and the second node, and a stabilization circuit configured to maintain a voltage level of the second node at a voltage level at which the fifth transistor is turned on.

According to an embodiment, the stabilization circuit may include a second capacitor connected between the first node and the output terminal.

According to an embodiment, the stabilization circuit may include a seventh transistor connected between the first node and the second transistor and including a gate connected to the second terminal, and a second capacitor connected between the output terminal and a node that is between the seventh transistor and the second transistor.

According to an embodiment, the stabilization circuit may include an eighth transistor connected between the first node and a fourth terminal to which a third voltage lower than the first voltage is input and including a gate connected to the second node.

According to an embodiment, the stabilization circuit may include a ninth transistor connected between the first transistor and the second transistor and including a gate connected to the second terminal, and a tenth transistor connected between a node that is between the ninth transistor and the second transistor and a fourth terminal to which a third voltage lower than the first voltage is input and including a gate connected to the second node, wherein the first node may be a node between the first transistor and the ninth transistor.

According to an embodiment, a conductive type of the fourth transistor may be opposite to a conductive type of the other transistors.

According to an embodiment, a first clock signal may be input to the clock terminal of each of odd-numbered stages among the plurality of stages, and a second clock signal may be input to the clock terminal of each of even-numbered stages, wherein the second clock signal may be shifted from the first clock signal by a half period.

According to an embodiment, the driving circuit may further include a third capacitor connected between the third terminal and the third node.

BRIEF DESCRIPTION OF THE DRAWINGS

The above and other aspects, features, and advantages of the present disclosure will become more apparent with reference to the following description taken in conjunction with the accompanying drawings.

DETAILED DESCRIPTION

Figure 1:
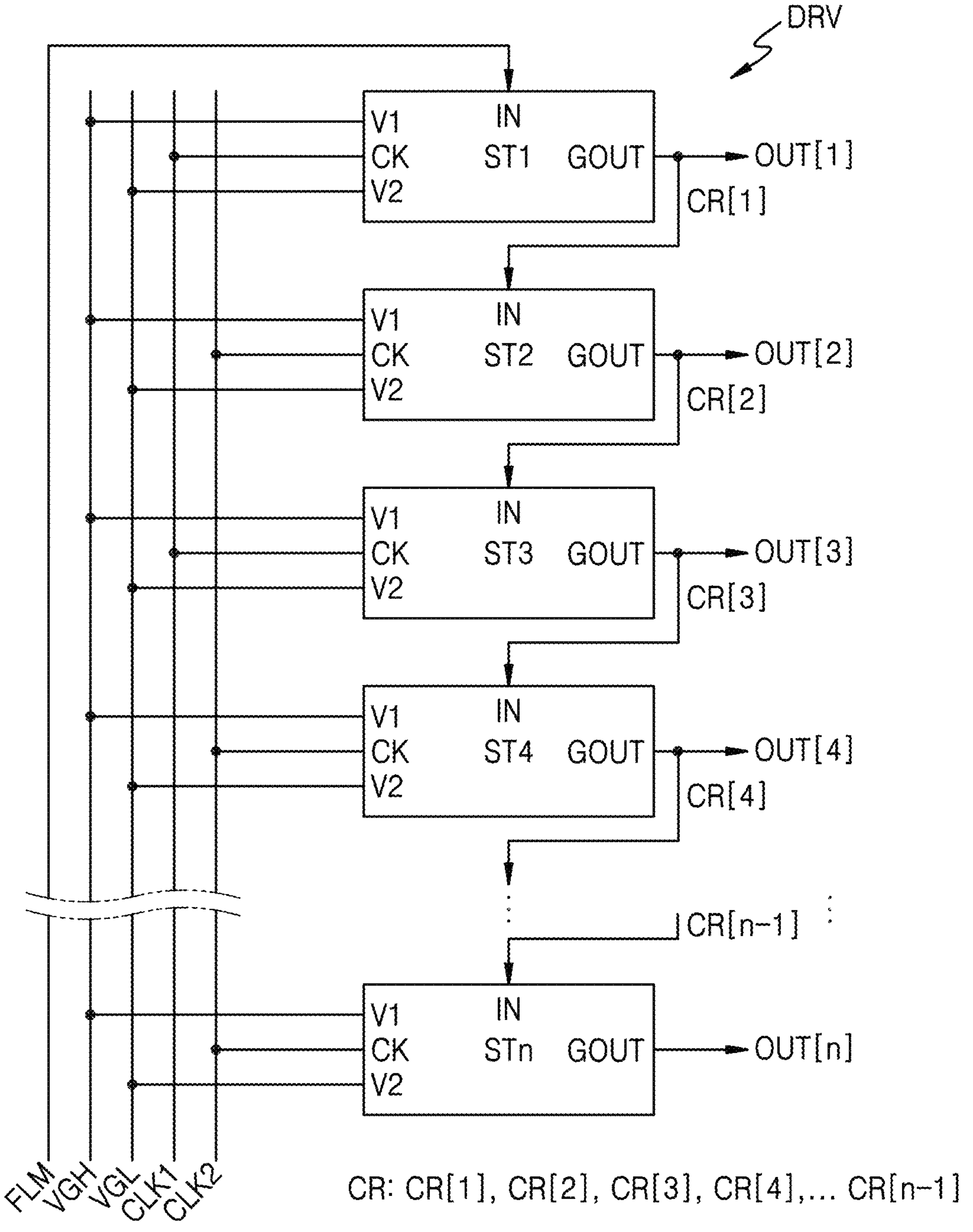
FIG. 1 is a schematic diagram of a driving circuit according to an embodiment.

Hereinafter, specific embodiments of the present disclosure are explained in detail with reference to the accompanying drawings. Like numerals refer to like elements throughout. In this regard, embodiments of the present disclosure may have different forms and should not be construed as being limited to the descriptions set forth herein. Accordingly, the embodiments are merely described below, by referring to the drawings, to explain aspects of the present description. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

As the present disclosure allows for various changes and can have numerous embodiments, specific embodiments will be illustrated in the drawings and described in the written description. The effects and features of the present disclosure as well as the methods of accomplishing the same will become apparent with reference to the following detailed description of the one or more embodiments, taken with the accompanying drawings. However, it should be noted that the present disclosure may have different forms and is not construed as being limited to the descriptions set forth herein.

While such terms as "first" and "second" may be used to describe various elements, such elements must not be limited to the above terms. The above terms are used only to distinguish one element from another.

The singular forms "a," "an," and "the" as used herein are intended to include the plural forms as well unless the context clearly indicates otherwise.

It will be understood that the terms "include," "comprise," and "have" as used herein specify the presence of stated features or elements but do not preclude the addition of one or more other features or elements.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

As used herein, when it is referred that X and Y are connected, it may include the case where X and Y are physically connected, the case where X and Y are functionally connected, and the case where X and Y are electrically connected. Also, when it is referred that X and Y are connected, it may include the case where X and Y are directly connected and the case where X and Y are indirectly connected with another element interposed therebetween. In this regard, X and Y may include elements (e.g. apparatuses, devices, circuits, wirings, electrodes, terminals, films, layers, regions, etc.).

For example, the case where X and Y are electrically connected may include the case where X and Y are directly electrically connected or the case where X and Y are indirectly electrically connected through another element interposed therebetween. In case of indirect electrical connection between X and Y, it may include the case where at least one component (e.g. a switch, a transistor, a capacitor, an inductor, a resistor, a diode, etc.) that enables the electrical connection between X and Y is connected between X and Y. Therefore, connection is not limited to a preset connection relationship, for example, not limited to a connection relationship illustrated in the drawings or detailed descriptions, and may include other connection relationships not illustrated in the drawings or detailed descriptions.

As used herein, the term "ON" used in association with the state of a device may denote an activated state of the device, and the term "OFF" may denote an inactivated state of the device. The term "ON" used in association with a signal received by a device may denote a signal activating the device, and the term "OFF" may denote a signal inactivating the device. A device may be activated by a high-level voltage or a low-level voltage. For example, a P-channel transistor (a P-type transistor) is activated by a low-level voltage, and an N-channel transistor (an N-type transistor) is activated by a high-level voltage. Therefore, it should be understood that "ON" voltages for a P-channel transistor and an N-channel transistor are opposite (low versus high) voltage levels. Hereinafter, a voltage for activating (i.e., turning on) a transistor is referred to as a gate on voltage, and a voltage for inactivating (i.e., turning off) a transistor is referred to as a gate off voltage.

Figure 2:
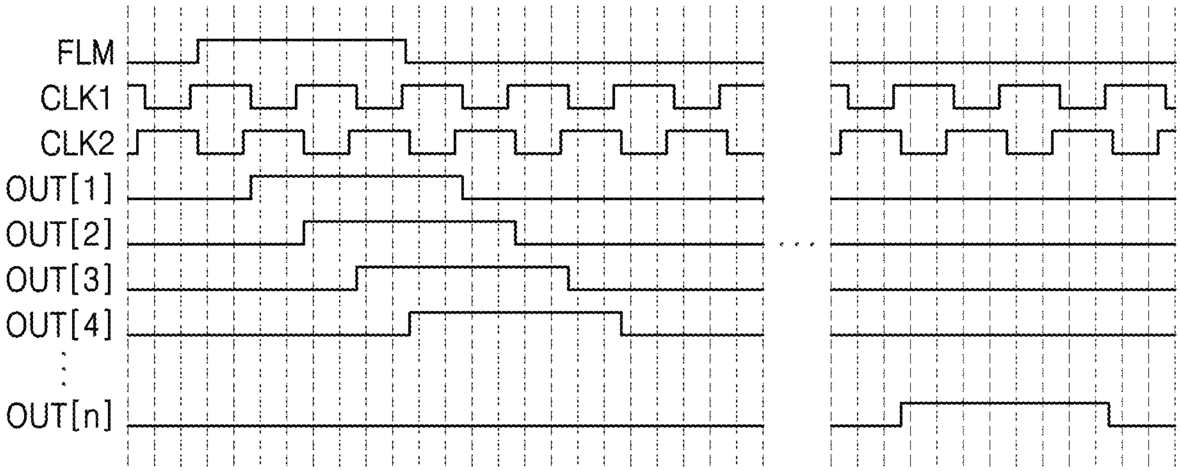
FIG. 2 is a diagram schematically showing input and output signals of a driving circuit according to an embodiment.

FIG. 1 is a schematic diagram of a driving circuit DRV according to an embodiment. FIG. 2 is a diagram schematically showing input and output signals of a driving circuit according to an embodiment.

Referring to FIG. 1, the driving circuit DRV according to an embodiment may include a plurality of stages ST1 to STn. The plurality of stages ST1 to STn (where n is an integer greater than or equal to 1) may sequentially output output signals OUT[1], OUT[2], OUT[3], OUT[4], . . . , OUT[n] to signal lines.

Each of the stages ST1 to STn may be connected to a signal line. Each of the stages ST1 to STn may receive at least one clock signal and at least one voltage signal and may generate an output signal OUT and output the same to the connected signal line. The stages ST1 to STn−1 may generate carry signals CR[1], CR[2], CR[3], CR[4], . . . , CR[n−1], respectively, and output the same to a next stage. In an embodiment, the carry signals CR[1], CR[2], CR[3], CR[4], . . . , CR[n−1] may be output signals (hereinafter, "previous output signals") output from a previous stage.

Each of the stages ST1 to STn may include a plurality of terminals to which a plurality of signals is input. The plurality of signals may include a clock signal and a voltage signal. The plurality of terminals may include an input terminal IN, a first voltage input terminal V1, a second voltage input terminal V2, a clock terminal CK, and an output terminal GOUT.

A start signal may be input (supplied) to the input terminal IN. The plurality of stages ST1 to STn may output the output signals OUT[1], OUT[2], OUT[3], OUT[4], . . . , OUT[n], respectively, in response to the start signal. The start signal may be an external signal FLM or the carry signals CR[1], CR[2], CR[3], CR[4], . . . , CR[n−1]. The external signal FLM may be input as a start signal to the input terminal IN of the first stage ST1, and a previous output signal may be input as a start signal to the input terminal IN of each of the second to nth stages ST2 to STn. The previous stage may be at least one stage before a current stage. FIG. 1 shows an example in which the previous stage is an immediately preceding stage. For example, the third output signal OUT[3] output from the third stage ST3 may be input to the input terminal IN of the fourth stage ST4 as a carry signal and a start signal.

A first voltage VGH may be input to the first voltage input terminal V1, and a second voltage VGL may be input to the second voltage input terminal V2. The second voltage VGL may be a voltage lower than the first voltage VGH.

A clock signal CLK may be input to the clock terminal CK. The clock signal CLK may include a first clock signal CLK1 and a second clock signal CLK2. The first clock signal CLK1 or the second clock signal CLK2 may be input to the clock terminal CK. The first clock signal CLK1 may be input to the clock terminal CK of the odd-numbered stages ST1, ST3, . . . . The second clock signal CLK2 may be input to the clock terminal CK of the even-numbered stages ST2, ST4, . . . .

As shown in FIG. 2, each of the first clock signal CLK1 and the second clock signal CLK2 may be a square wave signal in which a high-level voltage and a low-level voltage are repeated. In an embodiment, each of the first clock signal CLK1 and the second clock signal CLK2 may be a square wave signal in which the first voltage VGH and the second voltage VGL are repeated. The first clock signal CLK1 and the second clock signal CLK2 may be signals having the same waveform and shifted phases. For example, the second clock signal CLK2 may be input having the same waveform as the first clock signal CLK1 and phase-shifted (phase-delayed) therefrom by a certain interval. The second clock signal CLK2 may be shifted from the first clock signal CLK1 by a ½ period. In an embodiment, for the first clock signal CLK1 and the second clock signal CLK2, a period during which a high-level voltage is maintained and a period during which a low-level voltage is maintained may be the same during one period. In an embodiment, for the first clock signal CLK1 and the second clock signal CLK2, a period during which a high-level voltage is maintained may be longer than a period during which a low-level voltage is maintained during one period.

An output signal may be output from an output terminal GOUT. As shown in FIG. 2, the output signals OUT[1], OUT[2], OUT[3], OUT[4], . . . , OUT[n] output from the output terminals GOUT of the stages ST1 to STn may be sequentially shifted by a certain period. In an embodiment, the stages ST1 to STn may shift the output signals OUT[1], OUT[2], OUT[3], OUT[4], . . . , OUT[n] of a high-level voltage by a ½ period of a clock signal and sequentially output the same. In an embodiment, a high-level voltage and a low-level voltage of the output signals may be the first voltage VGH and the second voltage VGL, respectively.

Figure 3:
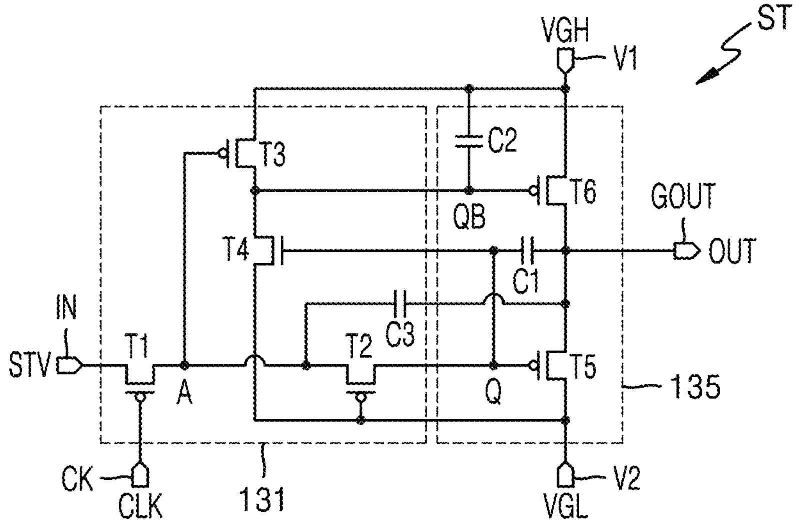
FIG. 3 is a circuit diagram schematically showing an example of a stage included in the driving circuit of FIG. 1.
Figure 4:
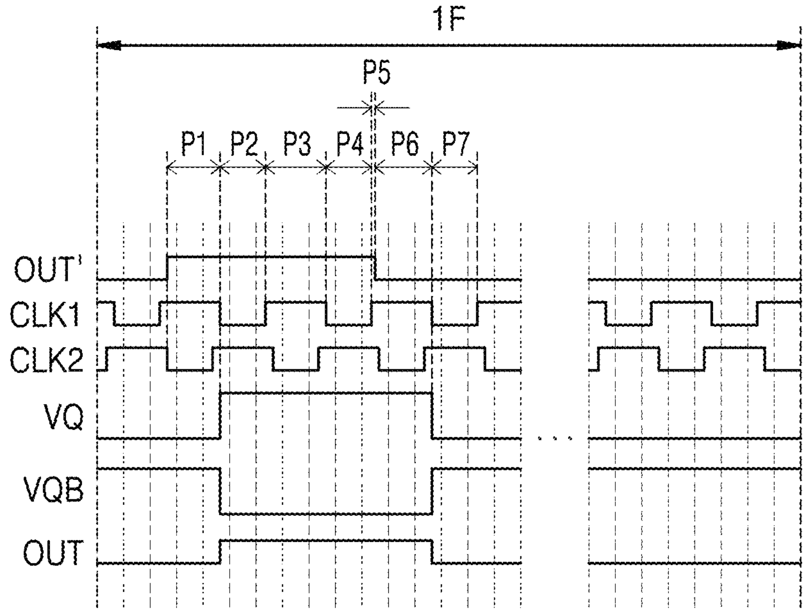
FIG. 4 is a timing diagram illustrating a method of driving the stage of FIG. 3.

FIG. 3 is a circuit diagram schematically showing an example of a stage ST included in the driving circuit DRV of FIG. 1. FIG. 4 is a timing diagram illustrating a method of driving the stage ST of FIG. 3.

Referring to FIG. 3, the stage ST may include a control circuit 131 and an output circuit 135. The control circuit 131 and the output circuit 135 may each include at least one transistor. The at least one transistor may include an N-channel transistor or a P-channel transistor. In an embodiment, an impurity conductivity type of the fourth transistor T4 of the stage ST may be opposite to an impurity conductivity type of the other transistors.

For example, the fourth transistor T4 of the stage ST may be an N-channel transistor, and a first transistor T1, a second transistor T2, a third transistor T3, a fifth transistor T5, and a sixth transistor T6 may be P-channel transistors.

The P-channel transistor may be a silicon transistor. The silicon transistor may include a silicon semiconductor, and the silicon semiconductor may include amorphous silicon, polysilicon, etc. For example, the silicon transistor may be a low-temperature polycrystalline silicon (LTPS) thin-film transistor.

The N-channel transistor may be an oxide transistor. The oxide transistor may include an oxide semiconductor, and the oxide semiconductor may include a Zn oxide-based material such as Zn oxide, In—Zn oxide, Ga—In—Zn oxide, etc. In an embodiment, the oxide semiconductor may be an In—Ga—Zn—O (IGZO) semiconductor. In an embodiment, the oxide semiconductor may be an In—Sn—Ga—Zn—O (ITGZO) semiconductor. For example, the oxide transistor may be a low-temperature polycrystalline oxide (LTPO) thin-film transistor.

A gate-on voltage of the P-channel transistor may be a low-level voltage, and a gate-off voltage of the P-channel transistor may be a high-level voltage. A gate-on voltage of the N-channel transistor may be a high-level voltage, and a gate-off voltage of the N-channel transistor may be a low-level voltage.

The control circuit 131 may control voltages of a first node A, a second node Q, and a third node QB in response to a signal input to the input terminal IN. For example, the control circuit 131 may control voltages of a first node A, a second node Q, and a third node QB in response to a start signal STV (for example, the external signal FLM or a carry signal CR (refer to FIG. 1)). In an embodiment, the carry signal CR may be a previous output signal OUT'. The control circuit 131 may include the first to fourth transistors T1 to T4.

The first transistor T1 may be connected between the input terminal IN and the first node A. A gate of the first transistor T1 may be connected to the clock terminal CK. When the clock signal CLK input to the clock terminal CK is at a low level, the first transistor T1 may be turned on to transmit the start signal STV input to the input terminal IN to the first node A. The clock signal CLK may be the first clock signal CLK1 or the second clock signal CLK2. In an embodiment, the first clock signal CLK1 may be input to the clock terminal CK of an odd-numbered stage ST, and the second clock signal CLK2 may be input to the clock terminal CK of an even-numbered stage ST. In an embodiment, the second clock signal CLK2 may be input to the clock terminal CK of the odd-numbered stage ST, and the first clock signal CLK1 may be input to the clock terminal CK of the even-numbered stage ST.

The second transistor T2 may be connected between the first node A and the second node Q. A gate of the second transistor T2 may be connected to the second voltage input terminal V2. The second transistor T2 may be turned on in response to the second voltage VGL input to the second voltage input terminal V2 and may transmit the start signal STV transmitted through the first transistor T1 to the second node Q. The second transistor T2 may always be turned on. Stress on the first transistor T1 due to voltage fluctuations of the second node Q may be alleviated by the second transistor T2.

The third transistor T3 may be connected between the first voltage input terminal V1 and the third node QB. A gate of the third transistor T3 may be connected to the first node A. When the start signal STV transmitted to the first node A is at a low level, the third transistor T3 may be turned on to transfer the first voltage VGH input to the first voltage input terminal V1 to the third node QB. Due to the third transistor T3, a voltage level of the third node QB may be opposite to a voltage level of the first node A.

The fourth transistor T4 may be connected between the third node QB and the second voltage input terminal V2. A gate of the fourth transistor T4 may be connected to the second node Q. When the start signal STV transmitted to the second node Q is at a high level, the fourth transistor T4 may be turned on to transfer the second voltage VGL input to the second voltage input terminal V2 to the third node QB. Due to the fourth transistor T4, the voltage level of the third node QB may be opposite to a voltage level of the second node Q.

The third transistor T3 and the fourth transistor T4 may control the voltage level of the third node QB according to the voltage level of the first node A or the voltage level of the second node Q and thus may serve as an inverter or a level shifter.

The output circuit 135 may be connected between the first voltage input terminal V1 and the second voltage input terminal V2. The output circuit 135 may output the output signal OUT of a high-level voltage or a low-level voltage according to voltage levels of the second node Q and the third node QB. The output circuit 135 may include the fifth transistor T5 and the sixth transistor T6. The output circuit 135 may further include a first capacitor C1 and a second capacitor C2.

The fifth transistor T5 may be connected between the output terminal GOUT and the second voltage input terminal V2. A gate of the fifth transistor T5 may be connected to the second node Q. The fifth transistor T5 may be a pull-down transistor which transfers a low-level voltage to the output terminal GOUT. When a voltage of the second node Q is at a low level, the fifth transistor T5 may be turned on and transfer the second voltage VGL, which is a low-level voltage, input to the second voltage input terminal V2 to the output terminal GOUT.

The sixth transistor T6 may be connected between the first voltage input terminal V1 and the output terminal GOUT. A gate of the sixth transistor T6 may be connected to the third node QB. The sixth transistor T6 may be a pull-up transistor which transfers a high-level voltage to the output terminal GOUT. When a voltage of the third node QB is at a low level, the sixth transistor T6 may be turned on and transfer the first voltage VGH, which is a high-level voltage, input to the first voltage input terminal V1 to the output terminal GOUT.

The first capacitor C1 may be connected between the output terminal GOUT and the second node Q. The second capacitor C2 may be connected between the first voltage input terminal V1 and the third node QB. The first capacitor C1 may maintain a voltage of the second node Q, and the second capacitor C2 may maintain a voltage of the third node QB. The first capacitor C1 may cause the voltage of the second node Q to fluctuate in connection with voltage fluctuations of the output terminal GOUT. The second capacitor C2 may be omitted.

The control circuit 131 may further include a stabilization circuit which prevents (minimizes) a voltage rise of the second node Q. The stabilization circuit may include a third capacitor C3. The third capacitor C3 may be connected between the first node A and the output terminal GOUT.

When the output signal OUT falls from high level to low level, a voltage level of a low-level voltage of the second node Q may fall further due to coupling of the first capacitor C1. When a period during which a voltage of the second node Q is at a low level becomes longer, a voltage level of the low-level voltage of the second node Q may rise due to a leakage current of the first transistor T1 and the second transistor T2, and a voltage level of the output signal OUT may also rise. As the voltage level of the output signal OUT rises, a voltage level of a low-level voltage of the first node A may also rise due to coupling of the third capacitor C3. As the low-level voltages of the first node A and the second node Q rise together, a source-drain voltage difference of the second transistor T2 may decrease, and thus, a leakage current of the second transistor T2 may decrease, and a rise in the low-level voltage of the second node Q may be minimized, and thus, a voltage of the second node Q may be stabilized.

Hereinafter, an operation of the stage ST shown in FIG. 3 will be described with reference to FIG. 4. For convenience of description, an example in which the stage ST of FIG. 3 is an odd-numbered stage and the first clock signal CLK1 is input to the clock terminal CK is described below. A start signal of the first odd-numbered stage (e.g., the first stage ST1) may be the external signal FLM, and a start signal of the second and subsequent odd-numbered stages may be the previous output signal OUT'. FIG. 4 is a timing diagram of an example in which the stage ST of FIG. 3 is any of the second and subsequent odd-numbered stages.

During a first period P1, the previous output signal OUT' of a high level may be input to the input terminal IN, and the first clock signal CLK1 of a high level may be input to the clock terminal CK.

The first transistor T1 may be turned off in response to the first clock signal CLK1 of a high level, and voltages of the first node A and the second node Q may be maintained at a low level as in the previous period, and the output signal OUT of a low level may be output through the fifth transistor T5. A voltage of the third node QB may be at a high level due to the third transistor T3 which is turned on.

During a second period P2, the previous output signal OUT' of a high level may be input to the input terminal IN, and the first clock signal CLK1 of a low level may be input to the clock terminal CK.

The first transistor T1 may be turned on in response to the first clock signal CLK1 of a low level. The second transistor T2 may be turned on in response to the second voltage VGL of a low level. The previous output signal OUT' of a high level may be transmitted to the first node A and the second node Q through the turned-on first and second transistors T1 and T2, and the fifth transistor T5 may be turned off.

The third transistor T3 having a gate connected to the first node A may be turned off, and the fourth transistor T4 having a gate connected to the second node Q may be turned on, and thus, a voltage of the third node QB may be the second voltage VGL of a low level. The sixth transistor T6 having a gate connected to the third node QB may be turned on, and the first voltage VGH of a high level may be transferred to the output terminal GOUT. Accordingly, the output terminal GOUT may output the output signal OUT of a high level.

During a third period P3, the previous output signal OUT' of a high level may be input to the input terminal IN, and the first clock signal CLK1 of a high level may be input to the clock terminal CK.

The first transistor T1 may be turned off in response to the first clock signal CLK1 of a high level, and the second transistor T2 may be turned on in response to the second voltage VGL of a low level. Voltages of the first node A and the second node Q may be maintained at a high level as in the second period P2, and the fifth transistor T5 may maintain the turned-off state. The fourth transistor T4 having a gate connected to the second node Q may maintain the turned-on state, and a voltage of the third node QB may be maintained at a low level. Accordingly, the output terminal GOUT may output the output signal OUT of a high level through the sixth transistor T6 which is turned on.

An operation of the stage ST in the fourth period P4 and the fifth period P5 is the same as the operation of the stage ST in the second period P2 and the third period P3, respectively, and thus, a description thereof is omitted.

During a sixth period P6, the previous output signal OUT' of a low level may be input to the input terminal IN, and the first clock signal CLK1 of a high level may be input to the clock terminal CK.

Although the previous output signal OUT' transitions from high level to low level, the first clock signal CLK1 of a high level may be input to the clock terminal CK, and thus, the first transistor T1 may be turned off. Accordingly, an operation of the stage ST may be the same as the operation of the stage ST in the fifth period P5 regardless of a voltage level of the previous output signal OUT'. Accordingly, the output terminal GOUT may output the output signal OUT of a high level.

During a seventh period P7, the previous output signal OUT' of a low level may be input to the input terminal IN, and the first clock signal CLK1 of a low level may be input to the clock terminal CK.

The first transistor T1 may be turned on in response to the first clock signal CLK1 of a low level, and the second transistor T2 may be turned on in response to the second voltage VGL of a low level. The previous output signal OUT' of a low level may be transmitted to the first node A and the second node Q through the turned-on first and second transistors T1 and T2, and the fifth transistor T5 may be turned on. Accordingly, the output terminal GOUT may output the output signal OUT of a low level.

The third transistor T3 having a gate connected to the first node A may be turned on, and the fourth transistor T4 having a gate connected to the second node Q may be turned off, and thus, a voltage of the third node QB may be the first voltage VGH of a high level.

Figure 5:
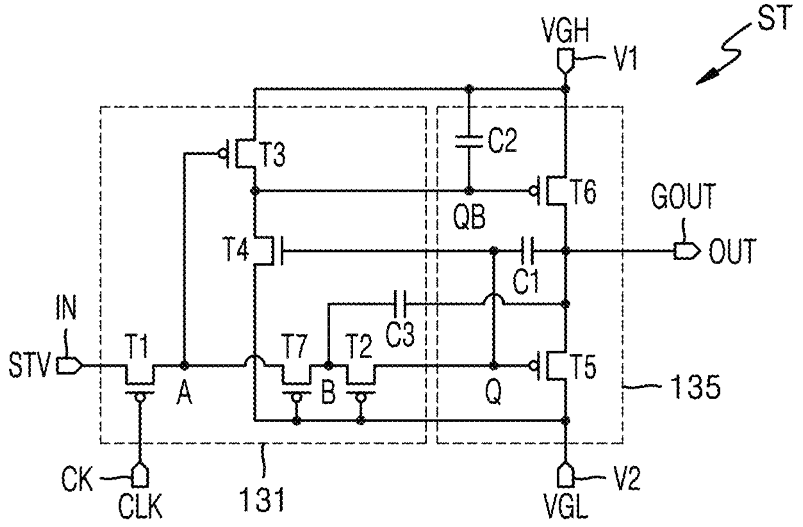
FIG. 5 is a circuit diagram showing an example of a stage included in the driving circuit of FIG. 1.

FIG. 5 is a circuit diagram showing an example of the stage ST included in the driving circuit DRV of FIG. 1. Differences from the stage ST shown in FIG. 3 are mainly described below.

The stage ST shown in FIG. 5 is different from the stage ST shown in FIG. 3 in that a seventh transistor T7 is added to the stabilization circuit, and other configurations and operations thereof are the same as those of the stage ST shown in FIG. 3.

The stabilization circuit of the control circuit 131 may include the third capacitor C3 and the P-channel seventh transistor T7.

The seventh transistor T7 may be connected between the first transistor T1 and the second transistor T2. The seventh transistor T7 may be connected between the first node A and a fourth node B. A gate of the seventh transistor T7 may be connected to the second voltage input terminal V2. The seventh transistor T7 may be turned on by the second voltage VGL input to the second voltage input terminal V2 and may transmit the start signal STV input through the first transistor T1 to the fourth node B. The seventh transistor T7 may always be turned on. As the seventh transistor T7 and the second transistor T2 are connected in series between the first node A and the second node Q, a leakage current of the seventh transistor T7 and the second transistor T2 may be reduced, and while a voltage of the second node Q is maintained at a low level for a long period of time, a rise in the low-level voltage may be minimized, and thus, the voltage of the second node Q may be stabilized.

Figure 6:
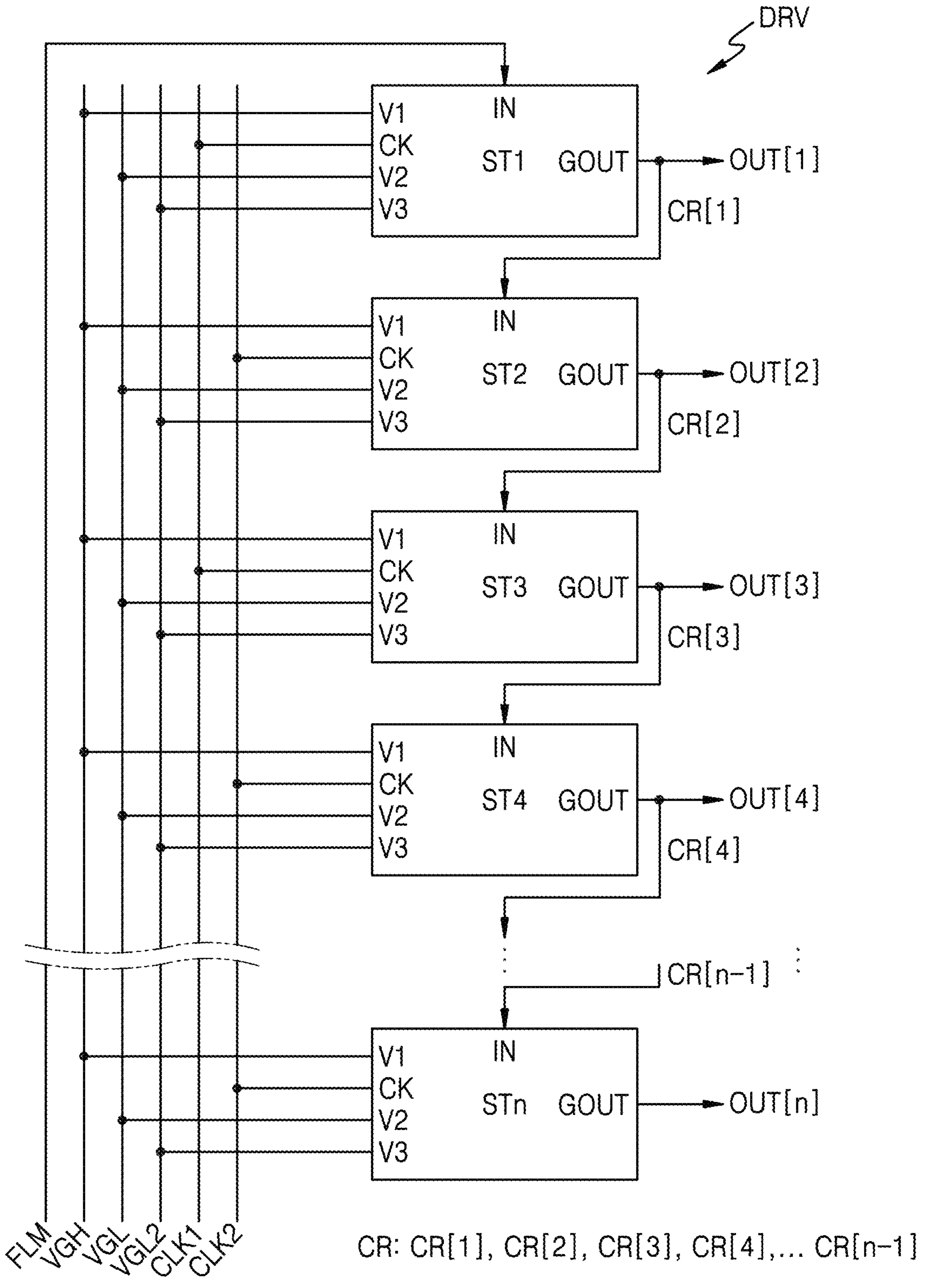
FIG. 6 is a schematic diagram of a driving circuit according to an embodiment.
Figure 7:
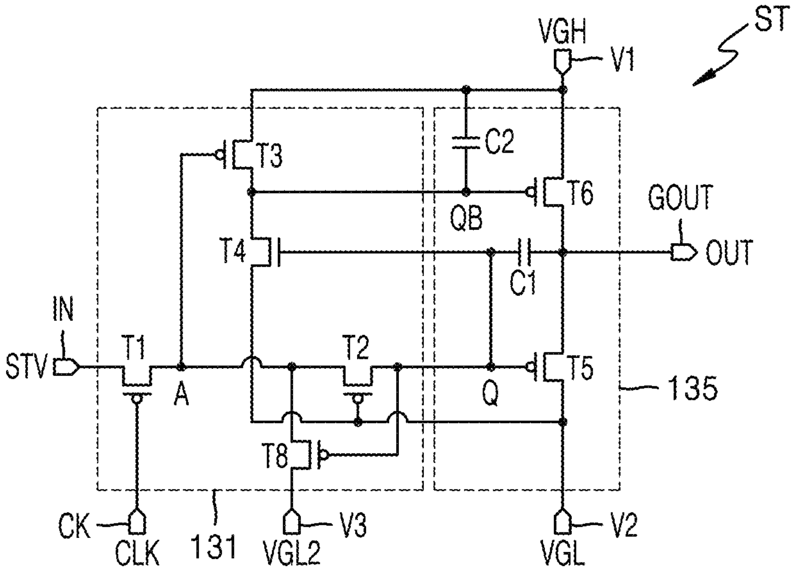
FIG. 7 is a circuit diagram schematically showing an example of a stage included in the driving circuit of FIG. 6.
Figure 8:
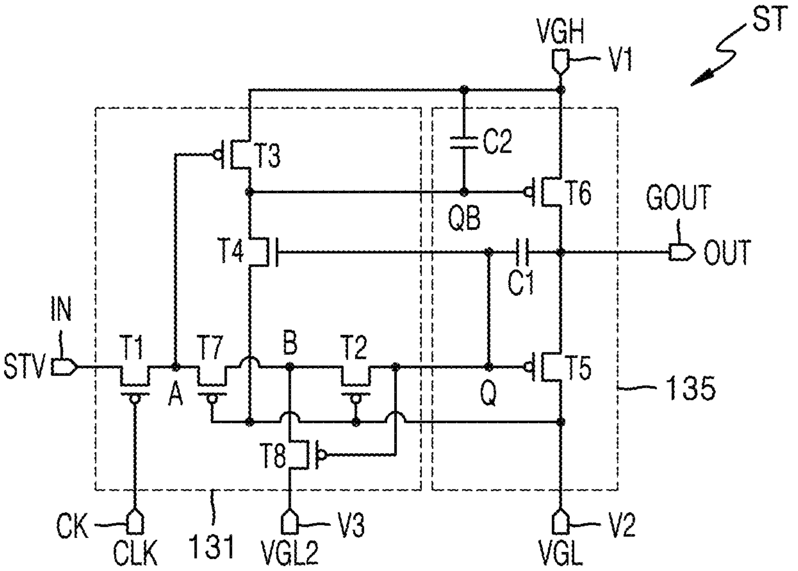
FIG. 8 is a circuit diagram schematically showing an example of a stage included in the driving circuit of FIG. 6.

FIG. 6 is a schematic diagram of the driving circuit DRV according to an embodiment. FIGS. 7 and 8 are diagrams schematically showing an example of the stage ST included in the driving circuit DRV of FIG. 6. Configurations different from those described with reference to FIGS. 1 to 4 are mainly described below.

The difference from the driving circuit DRV shown in FIG. 1 is that each of the plurality of stages ST1 to STn of the driving circuit DRV shown in FIG. 6 further includes a third voltage input terminal V3. A third voltage VGL2 may be input to the third voltage input terminal V3, and the third voltage VGL2 may be a voltage lower than the second voltage VGL.

In an embodiment, as shown in FIG. 7, the control circuit 131 of each of the plurality of stages ST1 to STn may include a stabilization circuit including a P-channel eighth transistor T8. The configuration and operation of the stage ST shown in FIG. 7 other than the stabilization circuit is the same as that of the stage ST shown in FIG. 3.

The eighth transistor T8 may be connected between the first node A and the third voltage input terminal V3. A gate of the eighth transistor T8 may be connected to the second node Q. When a voltage of the second node Q is at a low level, the eighth transistor T8 may be turned on and transfer the third voltage VGL2 input to the third voltage input terminal V3 to the first node A.

When the output signal OUT falls from high level to low level, a voltage level of a low-level voltage of the second node Q may fall further due to coupling of the first capacitor C1, and thus, a voltage of the second node Q may be a voltage lower than the second voltage VGL. Due to the turned-on eighth transistor T8 having a gate connected to the second node Q, a voltage of the first node A may be the third voltage VGL2 lower than the second voltage VGL. Accordingly, a source-drain voltage difference of the second transistor T2 may decrease, and thus, a leakage current of the second transistor T2 may decrease, and while a voltage of the second node Q is maintained at a low level for a long period of time, a rise in the low-level voltage may be minimized, and thus, a voltage of the second node Q may be stabilized.

In an embodiment, as shown in FIG. 8, the stabilization circuit of each of the plurality of stages ST1 to STn may include the P-channel seventh transistor T7 and the eighth transistor T8.

The seventh transistor T7 may be connected between the first transistor T1 and the second transistor T2. The seventh transistor T7 may be connected between the first node A and the fourth node B. A gate of the seventh transistor T7 may be connected to the second voltage input terminal V2. The seventh transistor T7 may be turned on in response to the second voltage VGL input to the second voltage input terminal V2 and may transmit the start signal STV input through the first transistor T1 to the fourth node B. The seventh transistor T7 may always be turned on.

The eighth transistor T8 may be connected between the fourth node B and the third voltage input terminal V3. A gate of the eighth transistor T8 may be connected to the second node Q. When a voltage of the second node Q is at a low level, the eighth transistor T8 may be turned on and transfer the third voltage VGL2 input to the third voltage input terminal V3 to the fourth node B.

As the seventh transistor T7 and the second transistor T2 are connected in series between the first node A and the second node Q, a leakage current of the seventh transistor T7 and the second transistor T2 may be reduced, and while a voltage of the second node Q is maintained at a low level for a long period of time, a rise in the low-level voltage may be minimized, and thus, the voltage of the second node Q may be stabilized.

Figure 9:
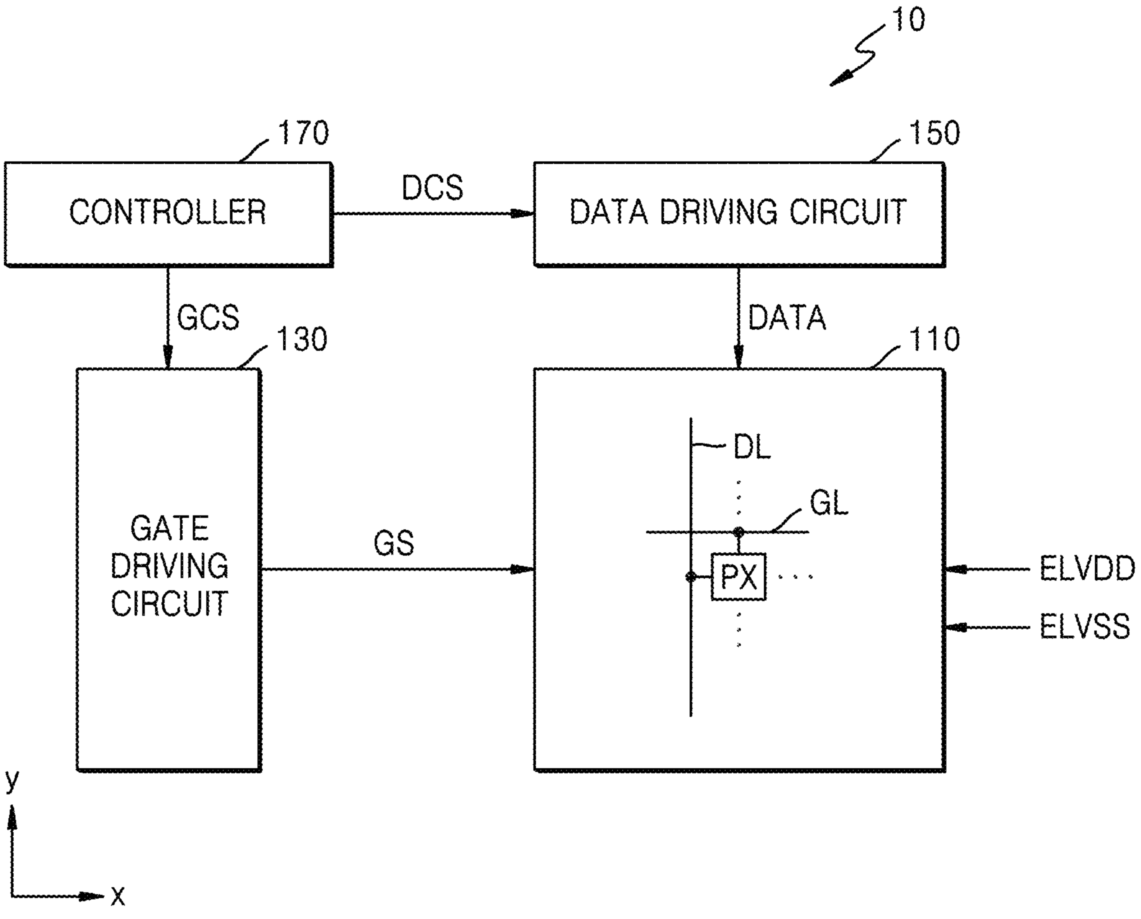
FIG. 9 is a schematic diagram of a display device according to an embodiment.
Figure 10A:
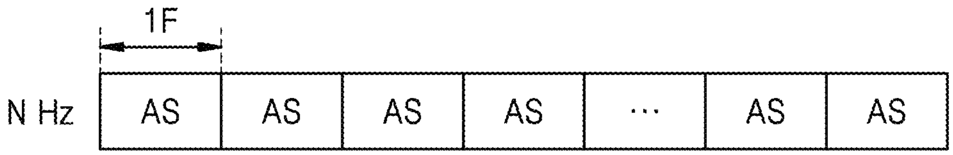
FIGS. 10A to 10 C are conceptual diagrams illustrating a method of driving a display device according to different driving frequencies.
Figure 10B:
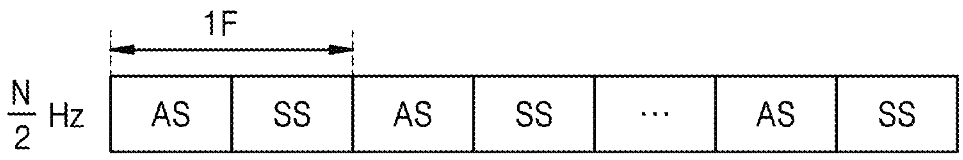
Figure 10C:
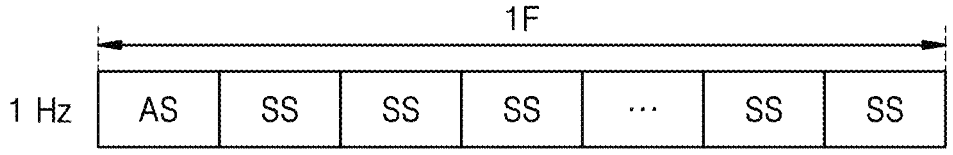

FIG. 9 is a schematic diagram of a display device 10 according to an embodiment. FIGS. 10A to 10C are conceptual diagrams illustrating a method of driving a display device according to a driving frequency.

The display device 10 according to an embodiment may be a display device, such as an organic light-emitting display, an inorganic light-emitting display (or an inorganic electroluminescent (EL) display), or a quantum dot light-emitting display.

Referring to FIG. 9, the display device 10 according to an embodiment may include a pixel area 110, a gate driving circuit 130, a data driving circuit 150, and a controller 170.

The pixel area 110 may correspond to a display area displaying an image. Various conductive lines each of which transmits an electrical signal to be applied to the display area, outer driving circuits electrically connected to pixel circuits, and pads to which a printed circuit board or a driver integrated circuit (IC) chip is attached may be positioned in a peripheral area (a non-display area) outside the display area. For example, the gate driving circuit 130, the data driving circuit 150, and the controller 170 may be arranged in the peripheral area.

A plurality of gate lines GL, a plurality of data lines DL, and a plurality of pixels PX connected thereto may be arranged in the pixel area 110. The plurality of pixels PX may be repeatedly arranged in a first direction (e.g., in a direction x or row direction) and a second direction (e.g., in a direction y or column direction). The plurality of pixels PX may be arranged in various forms, such as a stripe arrangement, a PenTile arrangement, a diamond arrangement, and a mosaic arrangement, to display an image. Each of the plurality of pixels PX may include an organic light-emitting diode as a display element, and the organic light-emitting diode may be connected to a pixel circuit. The pixel circuit may include a plurality of transistors and at least one capacitor. The pixel PX may emit, for example, red, green, blue, or white light through the organic light-emitting diode (OLED). Each pixel PX may be connected to a corresponding gate line among the plurality of gate lines GL and a corresponding data line among the plurality of data lines DL.

In an embodiment, the plurality of transistors included in the pixel circuit may be P-channel silicon transistors. In an embodiment, the plurality of transistors included in the pixel circuit may be N-channel oxide transistors. In an embodiment, some of the plurality of transistors included in the pixel circuit may be P-channel silicon transistors, and the others may be N-channel oxide transistors.

Each of the gate lines GL may extend in the direction x (row direction) and may be connected to pixels PX positioned in the same row. Each of the gate lines GL may transmit a gate signal to the pixels PX in the same row. Each of the data lines DL may extend in the direction y (column direction) and may be connected to pixels PX positioned in the same column. Each of the data lines DL may transmit a data signal to each of the pixels PX in the same column in response to the gate signal.

The gate driving circuit 130 may be connected to the plurality of gate lines GL and may generate a gate signal GS in response to a gate driving control signal GCS from the controller 170 and sequentially supply the same to the gate lines GL. The gate line GL may be connected to a gate of a transistor included in the pixel PX, and the gate signal GS may be a gate control signal for controlling the turn-on and turn-off of a transistor to which a gate line is connected. The gate signal GS may include a gate-on voltage at which the transistor may be turned on and a gate-off voltage at which the transistor may be turned off. The gate driving circuit 130 may include a plurality of stages which sequentially generate and output the gate signal GS.

The data driving circuit 150 may be connected to the plurality of data lines DL and may supply a data signal DATA to the data lines DL in response to a data driving control signal DCS from the controller 170. The data signal DATA supplied to the data lines DL may be supplied to the pixels PX to which the gate signal is supplied. The data driving circuit 150 may convert input image data having a gray scale input from the controller 170 into the data signal DATA in the form of voltage or current.

When the display device 10 is an organic light-emitting display device, a first power voltage ELVDD and a second power voltage ELVSS may be supplied to the pixels PX of the pixel area 110. The first power voltage ELVDD may be a high-level voltage which is provided to one terminal of a driving transistor connected to a first electrode (a pixel electrode or an anode) of the organic light-emitting diode of each pixel PX. The second power voltage ELVSS may be a low-level voltage which is provided to a second electrode (an opposite electrode or a cathode) of the organic light-emitting diode connected to the other terminal of the driving transistor. The first power voltage ELVDD and the second power voltage ELVSS may be driving voltages that allow the plurality of pixels PX to emit light. The first power voltage ELVDD and the second power voltage ELVSS may be input from the controller 170 or a power supply circuit (not shown).

The controller 170 may generate the gate driving control signal GCS and the data driving control signal DCS, based on signals input from the outside. The controller 170 may supply the gate driving control signal GCS to the gate driving circuit 130 and may supply the data driving control signal DCS to the data driving circuit 150. The gate driving control signal GCS may include a plurality of clock signals and a start signal. The data driving control signal DCS may include a plurality of clock signals and a start signal.

The display device 10 may include a display panel, and the display panel may include a substrate. The pixels PX may be arranged in the display area of the substrate. A portion of the gate driving circuit 130 or the entire gate driving circuit 130 may be directly formed in the peripheral area of the substrate during a process of forming a transistor, which constitute the pixel circuit in the display area of the substrate. The data driving circuit 150 and the controller 170 may each be in the form of an individual IC chip or may be in the form of a single IC chip, and may be disposed on a flexible printed circuit board (FPCB) electrically connected to a pad arranged at one side of the substrate. In an embodiment, the data driving circuit 150 and the controller 170 may be directly disposed on the substrate in a chip-on-glass (COG) or chip-on-plastic (COP) manner.

In an embodiment, the gate driving circuit 130 may include the driving circuit DRV having one of the stages ST shown in FIGS. 1 to 8. For example, the gate signal GS output to each gate line GL by the gate driving circuit 130 may correspond to the output signal OUT of a high level output to a signal line by each of the plurality of stages ST1 to STn of the driving circuit DRV shown in FIGS. 1 to 8. Each of the stages ST1 to STn may be connected to the gate line GL arranged in a corresponding row of the pixel area 110. Each of the stages ST1 to STn may generate the gate signal GS and output the same to the connected gate line GL. That is, each of the stages ST1 to STn may supply the gate signal GS to the corresponding gate line GL. In an embodiment, each of the stages ST1 to STn of the gate driving circuit 130 may include the stabilization circuit described above. The first voltage VGH, the second voltage VGL, the first clock signal CLK1, the second clock signal CLK2, and the external signal FLM input to the stages ST1 to STn may be input from the controller 170 shown in FIG. 9 or a power supply circuit (not shown).

A write transistor which transmits a data signal within the pixel PX may be an N-channel transistor which is turned on in response to a high-level gate signal.

The number of stages of the driving circuit DRV according to the present disclosure may be varied according to the number of rows (horizontal lines) arranged in the pixel area 110.

The display device 10 according to an embodiment may support a variable refresh rate (VRR). A refresh rate, which is a frequency at which data signals are substantially written to a driving transistor of the pixel PX, is also referred to as a screen scan rate or a screen refresh rate and may indicate the number of image frames reproduced for one second. In an embodiment, the refresh rate may be an output frequency of the gate driving circuit 130 or the data driving circuit 150. A frequency corresponding to the refresh rate may be a driving frequency. The display device 10 may adjust an output frequency of the gate driving circuit 130 and a corresponding output frequency of the data driving circuit 150 according to the driving frequency. The display device 10 supporting a VRR may operate by changing a driving frequency within the range between a maximum driving frequency and a minimum driving frequency. For example, if the refresh rate is about 120 Hz, the gate driving circuit 130 may output gate signals to each horizontal line (row) 120 times per second in synchronization with the timing of inputting data signals. The display device 10 may display an image while changing a driving frequency according to a refresh rate.

Depending on a driving frequency, one frame 1F may include only a first scan period AS, or may include the first scan period AS as well as one or more second scan periods SS. For example, as shown in FIG. 10A, the display device 10 operating at a driving frequency of N Hz may include one frame 1F which has one first scan period AS. As shown in FIG. 10B, the display device 10 operating at a driving frequency of N/2 Hz may include one frame 1F which has one first scan period AS and one second scan period SS. As shown in FIG. 10C, the display device 10 operating at a driving frequency of 1 Hz may include one frame 1F which has one first scan period AS and N−1 second scan periods SS. The lower the driving frequency, the longer one frame 1F may be.

The first scan period AS may be defined as an address scan period during which a data signal is written to the pixel PX in response to a gate signal for turning on a write transistor within the pixel PX and the pixel PX emits light at a luminance corresponding to the written data signal. An operation of writing a data signal from the data line DL to the pixel PX may also be referred to as a data programming operation.

A second scan period SS may be defined as a self scan period during which no data signal is written to the pixel PX due to a gate signal for turning off a write transistor of the pixel PX. During the second scan period SS, the data signal written and stored during the first scan period AS may be maintained in the pixel PX, and the pixel PX may emit light at a luminance corresponding to the data signal written during the first scan period AS.

Figure 11:
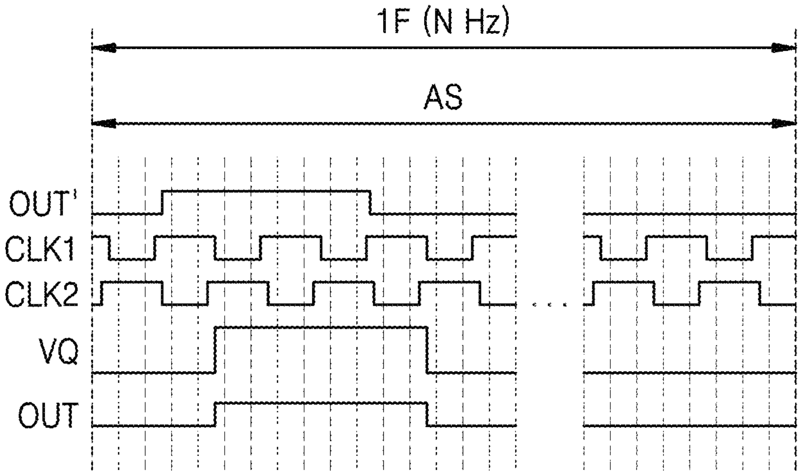
FIG. 11 is a diagram showing input and output signals of a stage during a first scan period, according to an embodiment.
Figure 12:
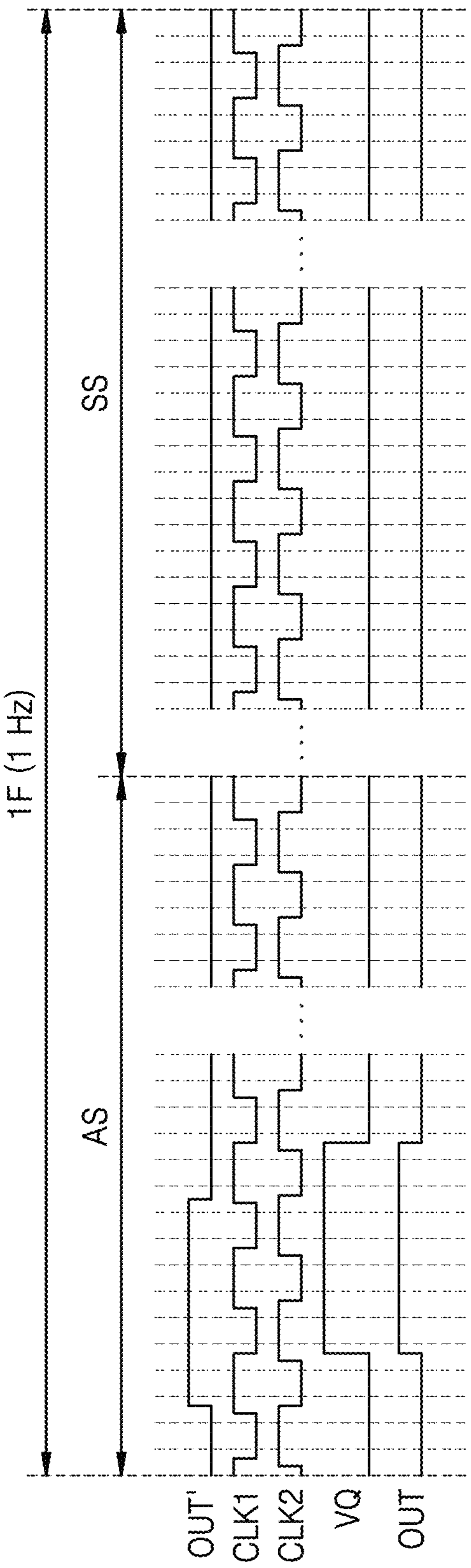
FIG. 12 is a diagram showing input and output signals of a stage during a second scan period, according to an embodiment.
Figure 13:
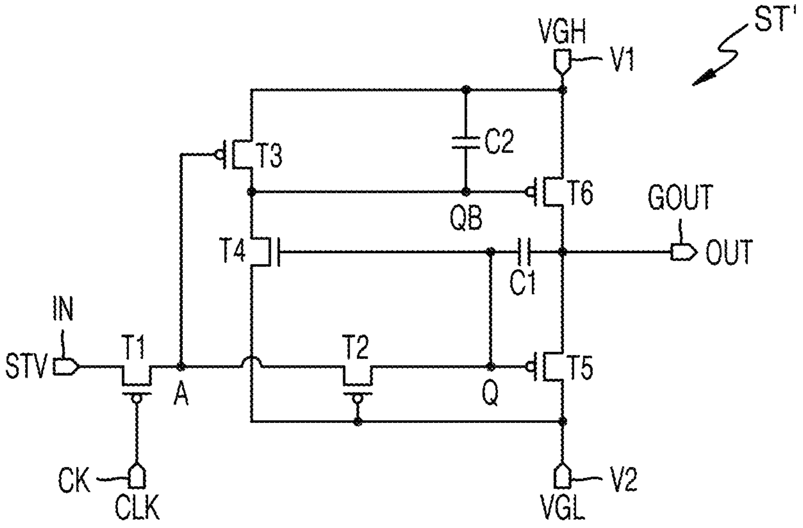
FIG. 13 is a circuit diagram of a stage according to a comparative example.
Figure 14:
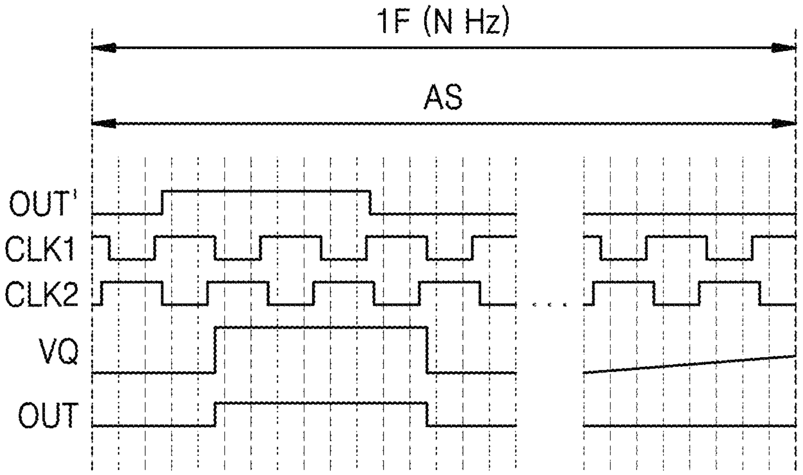
FIG. 14 is a diagram showing input and output signals of the stage according to the comparative example of FIG. 13 during a first scan period.
Figure 15:
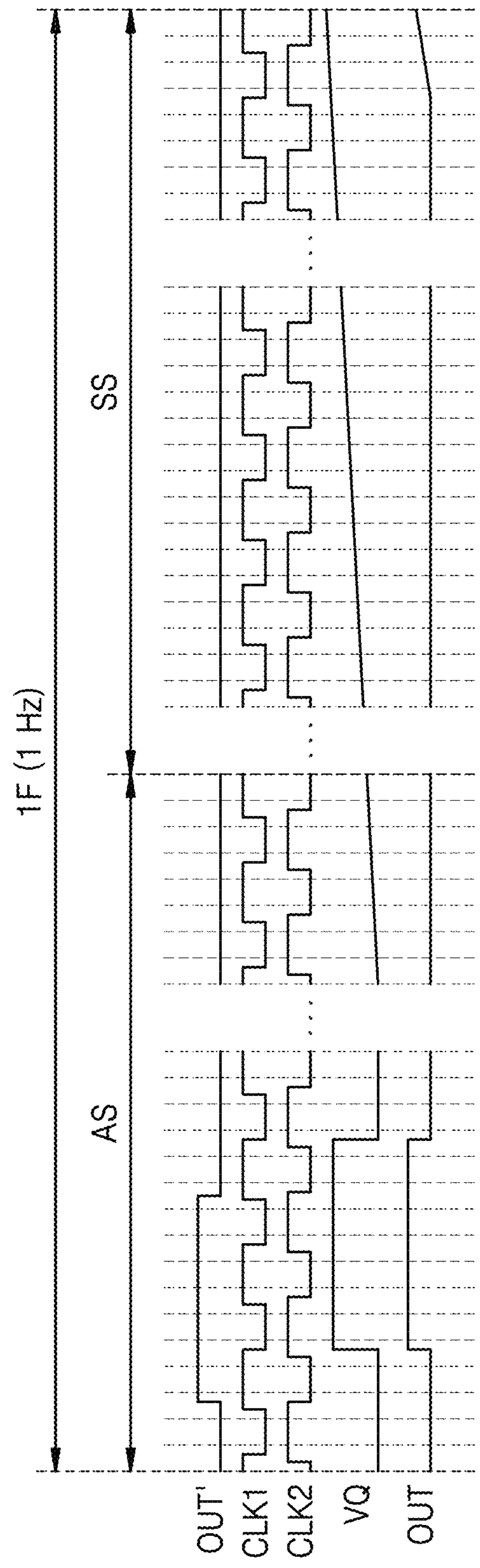
FIG. 15 is a diagram showing input and output signals of the stage according to the comparative example of FIG. 13 during a second scan period.

FIG. 11 is a diagram showing input and output signals of a stage during a first scan period, according to an embodiment. FIG. 12 is a diagram showing input and output signals of a stage during a second scan period, according to an embodiment. FIG. 13 is a circuit diagram of a stage ST' according to a comparative example. FIG. 14 is a diagram showing input and output signals of the stage ST' according to the comparative example of FIG. 13 during a first scan period. FIG. 15 is a diagram showing input and output signals of the stage ST' according to the comparative example of FIG. 13 during a second scan period.

The stage ST' according to the comparative example shown in FIG. 13 is an example in which the stage ST of the driving circuit DRV shown in FIGS. 1 to 8 includes no stabilization circuit.

As shown in FIGS. 11 and 12, the gate driving circuit 130 which includes the driving circuit DRV having the stage ST described herein may output the output signal OUT of a high level to a write transistor as a gate signal during the first scan period AS (a part time of the first scan period AS) and output the output signal OUT of a low level as a gate signal during the rest of the first scan period AS and the second scan periods SS. Due to the stabilization circuit of the stage ST, a voltage VQ of the second node Q and the output signal OUT of the stage ST may be stably maintained at a low level during N Hz high-frequency driving and 1 Hz low-frequency driving.

On the other hand, the stage ST' in the comparative example shown in FIG. 13 may have a rise in the voltage VQ of the second node Q within the first scan period AS during high-frequency driving at N Hz even though there is no rise in the output signal OUT, as shown in FIG. 14. But during low-frequency driving at 1 Hz, the output signal OUT may also gradually rise along with a rise in the voltage VQ of the second node Q because of repetition of the second scan period SS, as shown in FIG. 15. Due to the rise in the output signal OUT, luminance of the display device 10 may change or horizontal lines may appear on the screen.

According to the embodiment of the present disclosure described above, a driving circuit and a display device including the driving circuit may minimize dead space while stably outputting gate signals by configuring the driving circuit with a small number of transistors and capacitors.

According to the embodiment of the present disclosure, a plurality of stages of a driving circuit may include a stabilization circuit which maintains a voltage level of a node to which a gate of a pull-down transistor is connected at a turn-on voltage level of the pull-down transistor. Accordingly, during low-frequency driving, gate signals may be stably output without voltage fluctuations.

According to the embodiment of the present disclosure, a driving circuit and a display device including the driving circuit may be constituted with a small number of circuit elements to reduce the area of a non-display area while stably outputting gate signals. However, the scope of the disclosure is not limited by these effects of the present disclosure.

A display device according to some embodiments of the disclosure may be a device displaying a video or a static image, and may visually provide information to a user. The display device be used as a display screen of various electronic device, such as a television, a notebook computer, a monitor, a broadcasting panel, and an Internet of things (IOT) device, as well as portable electronic devices, such as a mobile phone, a smart phone, a tablet personal computer (PC), a mobile communication terminal, an electronic notebook, an electronic book, a portable multimedia player (PMP), a navigation device, and an ultra-mobile PC (UMPC). Also, the display device according to an embodiment may be used in wearable electronic device, such as a smart watch, a watch phone, a glasses-type display, and a head-mounted display (HMD). Also, the display device according to an embodiment may be used as an electronic device, such as a center information display (CID) on a dashboard of a vehicle or a center fascia or a dashboard of the vehicle, a room mirror display substituting a side-view mirror of a vehicle, or a display disposed on a rear surface of a front seat, as an entertainment device for a backseat of a vehicle. Also, the display device may be a flexible device.

It should be understood that embodiments described herein should be considered in a descriptive sense only and not for purposes of limitation. Descriptions of features or aspects within each embodiment should typically be considered as available for other similar features or aspects in other embodiments. While the present disclosure has been described with reference to the drawings and embodiments thereof, it will be understood by those of ordinary skill in the art that various changes in form and details may be made thereto without departing from the spirit and scope of the present disclosure as set forth in the following claims.

What is claimed is:

1. A driving circuit comprising a plurality of stages, wherein each of the plurality of stages comprises:

a first transistor connected between a first terminal to which a start signal is input and a first node and comprising a gate connected to a clock terminal to which a clock signal is input;

a second transistor connected between the first node and a second node and comprising a gate connected to a second terminal to which a first voltage is input;

a third transistor connected between a third terminal to which a second voltage higher than the first voltage is input and a third node and comprising a gate connected to the first node;

a fourth transistor connected between the third node and the second terminal and comprising a gate connected to the second node;

a fifth transistor connected between an output terminal and the second terminal and comprising a gate connected to the second node;

a sixth transistor connected between the third terminal and the output terminal and comprising a gate connected to the third node;

a first capacitor connected between the output terminal and the second node; and a second capacitor connected between the output terminal and a fourth node that is between the first transistor and the second transistor.

2. The driving circuit of claim 1, wherein the fourth node is the first node.

3. The driving circuit of claim 1, further comprising a seventh transistor connected between the first node and the second transistor and comprising a gate connected to the second terminal, wherein the fourth node is a node between the seventh transistor and the second transistor.

4. The driving circuit of claim 1, wherein the start signal is an external signal or a gate signal output from a previous stage.

5. The driving circuit of claim 1, wherein a conductive type of the fourth transistor is opposite to a conductive type of the other transistors.

6. The driving circuit of claim 1, wherein a first clock signal is input to the clock terminal of each of odd-numbered stages among the plurality of stages, and a second clock signal is input to the clock terminal of each of even-numbered stages, wherein the second clock signal is shifted from the first clock signal by a half period.

7. The driving circuit of claim 1, further comprising a third capacitor connected between the third terminal and the third node.

8. A driving circuit comprising a plurality of stages, wherein each of the plurality of stages comprises:

a first transistor connected between a first terminal to which a start signal is input and a first node and comprising a gate connected to a clock terminal to which a clock signal is input;

a second transistor connected between the first node and a second node and comprising a gate connected to a second terminal to which a first voltage is input;

a third transistor connected between a third terminal to which a second voltage higher than the first voltage is input and a third node and comprising a gate connected to the first node;

a fourth transistor connected between the third node and the second terminal and comprising a gate connected to the second node;

a fifth transistor connected between an output terminal and the second terminal and comprising a gate connected to the second node;

a sixth transistor connected between the third terminal and the output terminal and comprising a gate connected to the third node;

a seventh transistor connected between a fourth node between the first transistor and the second transistor and a fourth terminal to which a third voltage lower than the first voltage is input and comprising a gate connected to the second node; and a first capacitor connected between the output terminal and the second node.

9. The driving circuit of claim 8, wherein the fourth node is the first node.

10. The driving circuit of claim 8, further comprising an eighth transistor connected between the first node and the second transistor and comprising a gate connected to the second terminal, wherein the fourth node is a node between the eighth transistor and the second transistor.

11. The driving circuit of claim 8, wherein the start signal is an external signal or a gate signal output from a previous stage.

12. The driving circuit of claim 8, wherein a conductive type of the fourth transistor is opposite to a conductive type of the other transistors.

13. The driving circuit of claim 8, wherein a first clock signal is input to the clock terminal of each of odd-numbered stages among the plurality of stages, and a second clock signal is input to the clock terminal of each of even-numbered stages, wherein the second clock signal is shifted from the first clock signal by a half period.

14. The driving circuit of claim 8, further comprising a second capacitor connected between the third terminal and the third node.

15. A driving circuit comprising a plurality of stages, wherein each of the plurality of stages comprises:

a first transistor connected between a first terminal to which a start signal is input and a first node and comprising a gate connected to a clock terminal to which a clock signal is input;

a second transistor connected between the first node and a second node and comprising a gate connected to a second terminal to which a first voltage is input;

a third transistor connected between a third terminal to which a second voltage higher than the first voltage is input and a third node and comprising a gate connected to the first node;

a fourth transistor connected between the third node and the second terminal and comprising a gate connected to the second node;

a fifth transistor connected between an output terminal and the second terminal and comprising a gate connected to the second node;

a sixth transistor connected between the third terminal and the output terminal and comprising a gate connected to the third node;

a first capacitor connected between the output terminal and the second node; and a stabilization circuit configured to maintain a voltage level of the second node at a voltage level at which the fifth transistor is turned on.

16. The driving circuit of claim 15, wherein the stabilization circuit comprises a second capacitor connected between the first node and the output terminal.

17. The driving circuit of claim 15, wherein the stabilization circuit comprises:

a seventh transistor connected between the first node and the second transistor and comprising a gate connected to the second terminal; and a second capacitor connected between the output terminal and a node that is between the seventh transistor and the second transistor.

18. The driving circuit of claim 15, wherein the stabilization circuit comprises an eighth transistor connected between the first node and a fourth terminal to which a third voltage lower than the first voltage is input and comprising a gate connected to the second node.

19. The driving circuit of claim 15, wherein the stabilization circuit comprises:

a ninth transistor connected between the first transistor and the second transistor and comprising a gate connected to the second terminal; and a tenth transistor connected between a node that is between the ninth transistor and the second transistor and a fourth terminal to which a third voltage lower than the first voltage is input and comprising a gate connected to the second node, wherein the first node is a node between the first transistor and the ninth transistor.

20. The driving circuit of claim 15, wherein a conductive type of the fourth transistor is opposite to a conductive type of the other transistors.

21. The driving circuit of claim 15, wherein a first clock signal is input to the clock terminal of each of odd-numbered stages among the plurality of stages, and a second clock signal is input to the clock terminal of each of even-numbered stages, wherein the second clock signal is shifted from the first clock signal by a half period.

22. The driving circuit of claim 15, further comprising a third capacitor connected between the third terminal and the third node.

* * * * *